United States Patent
Sato et al.

(10) Patent No.: US 10,541,549 B2
(45) Date of Patent: Jan. 21, 2020

(54) POWER SUPPLY APPARATUS

(71) Applicant: Hitachi Automotive Systems, Ltd., Hitachinaka-shi, Ibaraki (JP)

(72) Inventors: Fumihiro Sato, Tokyo (JP); Takae Shimada, Tokyo (JP); Takuya Ishigaki, Tokyo (JP); Takayuki Ouchi, Tokyo (JP); Hiroyuki Shoji, Hitachinaka (JP); Naoya Takahashi, Hitachinaka (JP); Eigo Kishimoto, Hitachinaka (JP)

(73) Assignee: Hitachi Automotive Systems, Ltd., Hitachinaka-shi (JP)

( * ) Notice: Subject to any disclaimer, the term of this patent is extended or adjusted under 35 U.S.C. 154(b) by 25 days.

(21) Appl. No.: 15/576,344

(22) PCT Filed: Apr. 27, 2016

(86) PCT No.: PCT/JP2016/063123
§ 371 (c)(1),
(2) Date: Nov. 22, 2017

(87) PCT Pub. No.: WO2016/190032
PCT Pub. Date: Dec. 1, 2016

(65) Prior Publication Data
US 2018/0166903 A1 Jun. 14, 2018

(30) Foreign Application Priority Data
May 25, 2015 (JP) .................................. 2015-105074

(51) Int. Cl.
*H02J 7/02* (2016.01)
*H02J 7/00* (2006.01)

(52) U.S. Cl.
CPC ....... *H02J 7/022* (2013.01); *H02J 2007/0059* (2013.01)

(58) Field of Classification Search
USPC ........................................................ 320/140
See application file for complete search history.

(56) References Cited

U.S. PATENT DOCUMENTS

| 7,372,236 B2 | 5/2008 | Kobayashi |
| 7,977,921 B2 * | 7/2011 | Bahai ...................... H02J 7/022 320/140 |

(Continued)

FOREIGN PATENT DOCUMENTS

| JP | 2006-158103 A | 6/2006 |
| JP | 2007-259648 A | 10/2007 |

(Continued)

OTHER PUBLICATIONS

International Search Report (PCT/ISA/210) issued in PCT Application No. PCT/JP2016/063123 dated Jun. 28, 2016 with English translation (Four (4) pages).

(Continued)

Primary Examiner — Robert Grant
(74) Attorney, Agent, or Firm — Crowell & Moring LLP

(57) ABSTRACT

An object of the present invention is to provide a charging apparatus having high efficiency of charging a battery by inputting an alternating current voltage. A charging apparatus that charges a direct current battery includes a step-down converter unit to which a direct current voltage from a power supply is input and that converts the direct current voltage, and when a voltage of the direct current battery is between a predetermined first voltage smaller than a charge completion voltage of the direct current battery and the charge completion voltage, a variable voltage that increases from the first voltage to the charge completion voltage in accordance with charging of the direct current battery is input to the step-down converter unit.

16 Claims, 9 Drawing Sheets

(56) References Cited

U.S. PATENT DOCUMENTS

| | | | | |
|---|---|---|---|---|
| 8,450,977 B2* | 5/2013 | Niculae | ............... | H02M 1/08 |
| | | | | 320/134 |
| 2007/0108943 A1 | 5/2007 | Kobayashi | | |
| 2007/0194759 A1 | 8/2007 | Shimizu et al. | | |
| 2010/0066311 A1* | 3/2010 | Bao | ............... | H02J 7/0073 |
| | | | | 320/162 |
| 2010/0231175 A1 | 9/2010 | Noda | | |
| 2013/0128639 A1* | 5/2013 | Ettes | ............... | H02M 7/217 |
| | | | | 363/126 |
| 2015/0069958 A1* | 3/2015 | Yang | ............... | H02J 7/0052 |
| | | | | 320/107 |

FOREIGN PATENT DOCUMENTS

| | | |
|---|---|---|
| JP | 2008-199804 A | 8/2008 |
| JP | 2012-85378 A | 4/2012 |
| JP | 2014-192038 A | 10/2014 |
| WO | WO 2005/050813 A1 | 6/2005 |
| WO | WO 2011/118118 A1 | 9/2011 |

OTHER PUBLICATIONS

Japanese-language Written Opinion (PCT/ISA/237) issued in PCT Application No. PCT/JP2016/063123 dated Jun. 28, 2016 (Six (6) pages).

* cited by examiner

POWER SUPPLY APPARATUS

TECHNICAL FIELD

The present invention relates to a power supply apparatus for charging a battery from an alternating current voltage.

BACKGROUND ART

In recent years, due to the growing awareness of global environmental conservation, the spread of electric vehicles and plug-in hybrid vehicles is desired. These vehicles are equipped with a direct current battery that supplies power to a motor during traveling. To charge the direct current battery safely with less electric power when charging the direct current battery from a commercial alternating current power supply, a power supply apparatus having high conversion efficiency and including a function of insulating the commercial power supply from the direct current battery is needed.

PTL 1 discloses a resonant charging apparatus that includes an alternating current to direct current (AC-DC) converter and a resonant direct current to direct current (DC-DC) converter and that raises an input voltage of the resonant DC-DC converter as a battery voltage rises to improve the conversion efficiency.

CITATION LIST

Patent Literature

PTL 1: JP 2012-085378 A (Shimada)

SUMMARY OF INVENTION

Technical Problem

To complete the charging of the direct current battery in a short time, it is desirable to charge with the maximum input power. Therefore, since a charging current increases under a condition that the voltage of the direct current battery is low, the current capacity of the resonant DC-DC converter tends to become large in the resonant charging apparatus disclosed in PTL 1.

An object of the present invention is to provide a charging apparatus having high efficiency of charging a battery by inputting an alternating current voltage.

Solution to Problem

In order to achieve the above object, a charging apparatus according to the present invention includes a first converter unit that converts a direct current voltage and a second converter unit connected between the first converter unit and the direct current battery, and the second converter unit includes a first operation mode in which a predetermined first voltage lower than a charge completion voltage of the direct current battery is input for a fixed time and a second operation mode in which a variable voltage that increases from the first voltage to the charge completion voltage is input.

Advantageous Effects of Invention

According to the present invention, it is possible to provide the charging apparatus having high efficiency of charging the battery.

BRIEF DESCRIPTION OF DRAWINGS

FIG. 3A is a diagram illustrating a control block of a DC-DC circuit 9a.

FIG. 3B is a diagram illustrating a control block of a DC-DC converter 3a.

FIG. 4A is a diagram illustrating another embodiment of the control block of the DC-DC circuit 9a.

FIG. 4B is a diagram illustrating another embodiment of the control block of the DC-DC converter 3a.

FIG. 5A is a diagram illustrating another embodiment of the control block of the DC-DC circuit 9a.

FIG. 5B is a diagram illustrating another embodiment of the control block of the DC-DC converter 3a.

FIG. 8 is a circuit configuration diagram illustrating another embodiment of the DC-DC converter 3a.

DESCRIPTION OF EMBODIMENTS

Hereinafter, embodiments of a power converter according to the present invention will be described with reference to the drawings. Note that in each figure, the same reference signs are given to the same elements, and duplicate description is omitted.

First Embodiment

Figure 1:
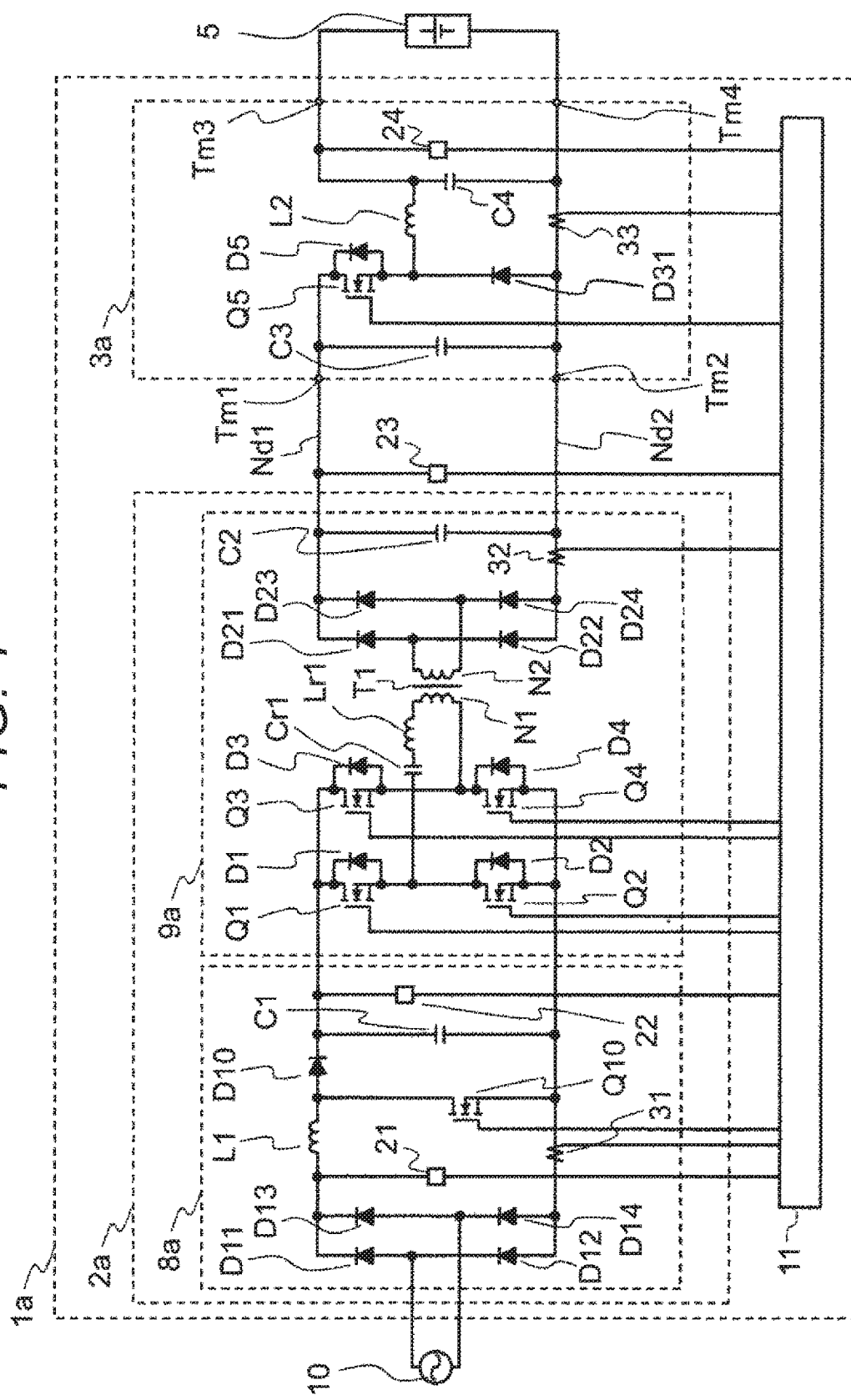
FIG. 1 is a circuit configuration diagram of a charging apparatus 1a according to a first embodiment.

FIG. 1 is a circuit configuration diagram of a charging apparatus 1a according to a first embodiment. The charging apparatus 1a receives power from an alternating current power supply 10, outputs the power to a direct current battery 5, and charges the direct current battery 5.

The charging apparatus 1a according to the present embodiment includes an insulated AC-DC converter 2a, a DC-DC converter 3a, and a control unit 11 that controls these converters. The insulated AC-DC converter 2a and the DC-DC converter 3a are connected via nodes Nd1-Nd2. The insulated AC-DC converter 2a outputs a link voltage Vlink insulated from the alternating current power supply 10. The link voltage Vlink is input to the DC-DC converter 3a connected via the nodes Nd1-Nd2.

The insulated AC-DC converter 2a includes an AC-DC circuit 8a and a DC-DC circuit 9a. The AC-DC circuit 8a converts an input voltage of the alternating current power supply 10 and outputs a direct current voltage. The direct current voltage output from the AC-DC circuit 8a is input to the DC-DC circuit 9a. The DC-DC circuit 9a outputs the link voltage Vlink.

The AC-DC circuit 8a rectifies the full waves of the voltage of the alternating current power supply 10 by diodes D11 to D14 connected in a bridge connection. This full-wave rectified voltage is input to a step-up chopper circuit. The step-up chopper circuit includes a smoothing inductor L1, a switching element Q10, a diode D10, and a smoothing capacitor C1. The AC-DC circuit 8a outputs a direct current voltage across the smoothing capacitor C1. The control unit 11 is provided with a power factor improvement control that controls an input current from the alternating current power supply 10 so as to be in a sinusoidal waveform substantially similar to that of the voltage of the alternating current power supply 10.

The DC-DC circuit 9a includes a transformer T1 that magnetically couples a winding wire N1 and a winding wire N2. A resonance capacitor Cr1 and a resonance inductor Lr1 are connected in series to the winding wire N1. Note that the resonance inductor Lr1 may be omitted owing to a leakage inductance and a wiring inductance of the transformer T1.

The DC-DC circuit 9a includes a switching circuit in which switching elements Q1 to Q4 are connected in a full bridge connection to a side of the winding wire N1 of the transformer T1. The switching circuit converts the direct current voltage input from the smoothing capacitor C1 of the AC-DC circuit 8a into a rectangular wave voltage. The rectangular wave voltage is applied to the series connection body of the resonance capacitor Cr1, the resonance inductor Lr1 and the winding wire N1. A resonance current flows through the winding wire N1.

The DC-DC circuit 9a includes a rectifier circuit in which diodes D21 to D24 are connected in abridge connection to a side of the winding wire N2 of the transformer T1. The rectifier circuit rectifies a current induced in the winding wire N2. The rectified current is smoothed by a smoothing capacitor C2. A voltage across the smoothing capacitor C2 is output as the link voltage Vlink between the nodes Nd1-Nd2. In this way, the DC-DC circuit 9a constitutes a resonant converter and basically controls the output (Vlink) by changing a switching frequency of the switching elements Q1 to Q4.

In the DC-DC converter 3a according to the present embodiment, the link voltage Vlink is input between terminals Tm1-Tm2, and a direct current voltage is output from between terminals Tm3-Tm4. The DC-DC converter 3a includes a smoothing capacitor C3, a switching element Q5, a diode D31, a smoothing inductor L2, and a smoothing capacitor C4. The smoothing capacitor C3 is connected between the terminals Tm1-Tm2. The switching element Q5 and the diode D31 are connected in series, and the series connection body is connected between the terminals Tm1-Tm2. The smoothing inductor L2 and the smoothing capacitor C4 are connected in series, and the series connection body is connected across the diode D31. A voltage across the smoothing capacitor C4 is output from between the terminals Tm3-Tm4. Then, the direct current battery 5 is connected between the terminals Tm3-Tm4.

Diodes D1 to D5 are connected in anti-parallel to switching elements Q1 to Q5, respectively. Herein, when metal-oxide-semiconductor field-effect transistors (MOSFETs) are used as the switching elements Q1 to Q5, parasitic diodes of MOSFETs can be used as the diodes D1 to D5. In addition, one of the smoothing capacitors C2 and C3 connected in parallel may be omitted in some cases.

The charging apparatus 1a includes a voltage sensor 21 that detects the full-wave rectified voltage of the alternating current power supply 10, as a voltage sensor, a voltage sensor 22 that detects the direct current voltage output from the AC-DC circuit 8a, a voltage sensor 23 that detects the link voltage Vlink, and a voltage sensor 24 that detects the voltage of the smoothing capacitor C4, that is, the voltage of the direct current battery 5. In addition, the charging apparatus 1a includes, as current sensors, a current sensor 31 that detects a full-wave rectified current of the alternating current power supply 10, a current sensor 32 that detects an output current of the DC-DC circuit 9a, and a current sensor 33 that detects a current of the smoothing inductor L2, that is, a current of the direct current battery 5. The outputs of these voltage sensors and current sensors are input to the control unit 11.

As described above, the DC-DC circuit 9a constitutes the resonant converter and basically changes the switching frequency of the switching elements Q1 to Q4, thereby adjusting a magnitude of the resonance current flowing through the winding wires N1 and N2 and controlling the output. Specifically, by increasing the switching frequency, an output voltage is lowered (output power is decreased). Conversely, by lowering the switching frequency, an output voltage is raised (output power is increased).

Therefore, in order to widen an output voltage range, it is necessary to widen a change range of the switching frequency. However, when the switching frequency is set too high, a breaking current of the switching elements Q1 to Q4 increases, and a switching loss increases. In addition, when the switching frequency is set too low, a peak value of the current flowing through the switching elements Q1 to Q4 and the winding wires N1 and N2 increases, and a conduction loss may increase. When the output voltage range of the DC-DC circuit 9a, that is, the output voltage range of the insulated AC-DC converter 2a is widened in this way, the losses tend to increase and efficiency tends to decrease.

On the other hand, in a charging apparatus 1 according to the present embodiment, by including the DC-DC converter 3a that operates as a step-down converter. Therefore, it is possible to narrow a voltage range of the link voltage Vlink, as compared with a voltage range of the direct current battery 5. The DC-DC converter 3a causes the switching element Q5 to perform a switching operation, and outputs electric power input from between the terminals Tm1-Tm2 between the terminals Tm3-Tm4. At this time, by controlling an on-time ratio of the switching element Q5, it is possible to maintain the link voltage Vlink at a free voltage value, for example, at an almost constant voltage within a range of the voltage of the direct current battery 5 or higher.

In addition, if the switching element Q5 is fixed to an on state, a through operation is performed, and a short-circuit can be substantially caused between the terminals Tm1-Tm2 and between the terminals Tm3-Tm4 in a direct current manner via the smoothing inductor L2. When this through operation is performed, the switching element Q5 is not caused to perform the switching operation. Therefore, it is possible to maintain the link voltage Vlink and the voltage of the direct current battery 5 at almost the same voltage value while the switching loss and a core loss of the smoothing inductor L2 are suppressed.

The charging apparatus 1a according to the present embodiment includes the DC-DC converter 3a that steps down the link voltage Vlink by the switching operation of the switching element Q5. Therefore, it is possible to make the voltage range of the link voltage Vlink smaller than the voltage range of the direct current battery 5. Consequently, the output voltage range of the insulated AC-DC converter 2a can be narrowed, and it is possible to suppress the reduction in efficiency in the insulated AC-DC converter 2a. Therefore, the charging apparatus 1a according to the present embodiment can charge the direct current battery 5 from the alternating current power supply 10 at high efficiency.

Note that when the switching element Q5 of the DC-DC converter 3a is caused to perform the switching operation, the switching loss and the core loss of the smoothing inductor L2 occur. Therefore, trying to maintain the link voltage Vlink at a constant voltage may adversely cause a decrease in the efficiency. However, even in that case, if an efficiency improvement (loss reduction) effect by narrowing the voltage range of the link voltage Vlink is smaller than efficiency reduction (loss increase) due to the switching operation of the switching element Q5, it is sufficient to cause the DC-DC converter 3a to perform the through operation.

Figure 2:
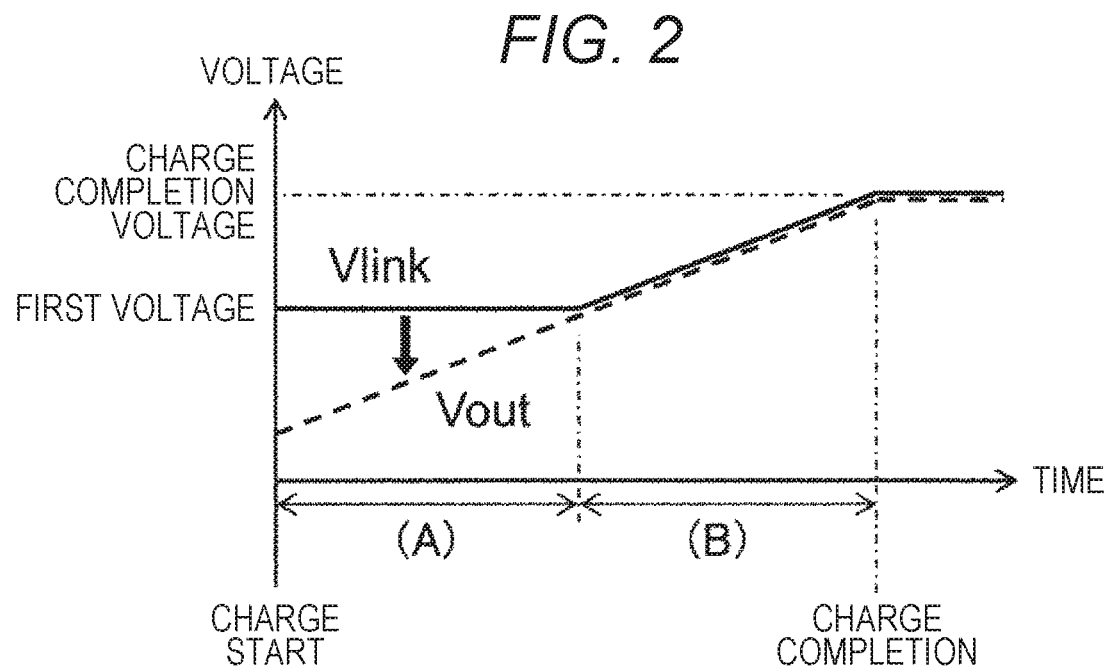
FIG. 2 is a graph illustrating temporal changes in a link voltage and a battery voltage during a charging operation.

An exemplary preferable charging operation using the charging apparatus 1a described above will be described with reference to FIG. 2. FIG. 2 is a graph illustrating temporal changes in the link voltage Vlink and a battery voltage Vout during the charging operation. In the figure, a solid line illustrates the link voltage Vlink and a broken line illustrates the battery voltage Vout.

As described above, in the charging apparatus 1a according to the present embodiment, the DC-DC converter 3a performs the step-down operation or the through operation for the link voltage Vlink output from the DC-DC circuit 9a and outputs Vout to the direct current battery 5. In a period A in FIG. 2, the link voltage Vlink is maintained at a predetermined first voltage by controlling the on-time ratio of the switching element Q5.

Herein, the first voltage is a voltage lower than a charge completion voltage of the direct current battery 5. In the present embodiment, especially, this first voltage is a voltage input from the AC-DC circuit 8a to the DC-DC circuit 9a. At this time, since Vlink that is an output voltage of the DC-DC circuit 9a is higher than the first voltage that is an input voltage of the DC-DC circuit 9a, the DC-DC circuit 9a is a step-up converter that performs a boost operation. If the DC-DC circuit 9a operates as the step-up converter, efficiency in a DC-DC circuit 9a section can be increased by adjusting a winding ratio between the winding wires N1 and N2 of the transformer T1.

In the period A of FIG. 2, the DC-DC converter 3a steps down the link voltage Vlink and outputs Vout to the direct current battery 5. Then, as the on-time ratio of the switching element Q5 gradually increases, Vout that is a voltage output to the direct current battery 5 increases.

When Vout exceeds the first voltage, the on-time ratio of the switching element Q5 reaches the upper limit value. Thereafter, the through operation is performed in which the switching element Q5 is fixed to the on state. A through operation period is illustrated by a period B in FIG. 2. Since the switching element Q5 is not caused to perform the switching operation during the period B, the switching loss and the core loss of the smoothing inductor L2 are suppressed. Note that in the period B of FIG. 2, a solid line illustrating Vlink and a broken line illustrating Vout are intentionally illustrated without overlapping each other such that Vlink and Vout are easily visually recognizable.

Then, when the battery voltage Vout reaches the predetermined charge completion voltage, the charging operation is completed. Note that in the present embodiment, a voltage at which the direct current battery 5 is fully charged is used as the charge completion voltage. However, the charge completion voltage defined in the present invention is not particularly limited to this voltage. For example, in a case where charging is performed until a predetermined target voltage such as about 95% of a full charge state is reached, the target voltage may be set as the charge completion voltage. In addition, as the charge completion voltage defined in the present invention, a battery voltage at a time point when charging is completed or stopped under another condition may be taken as the charge completion voltage.

Figure 3A:
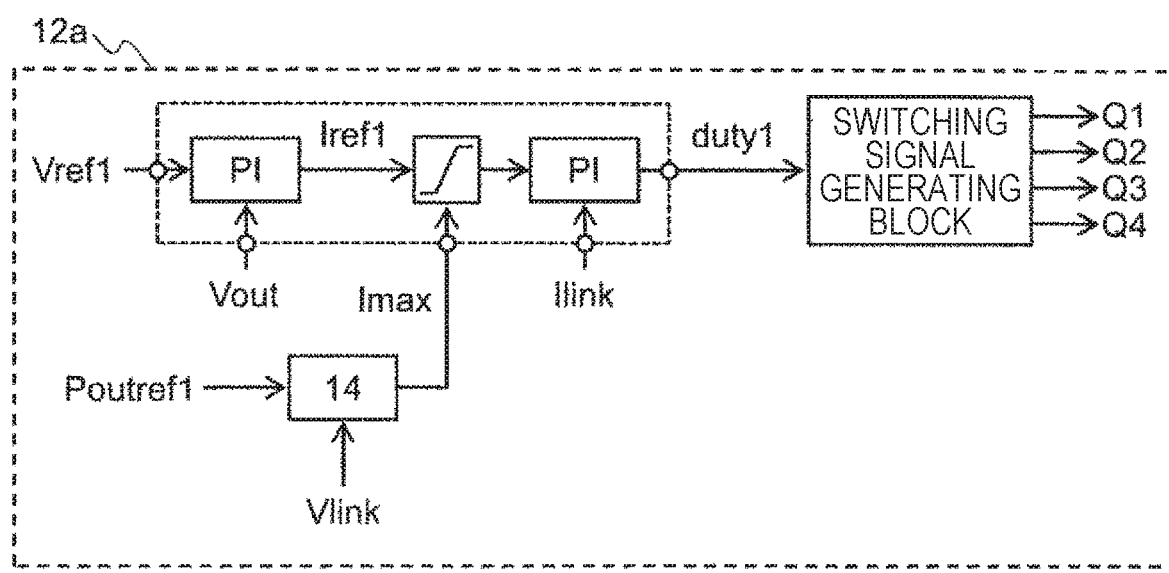
Figure 3B:
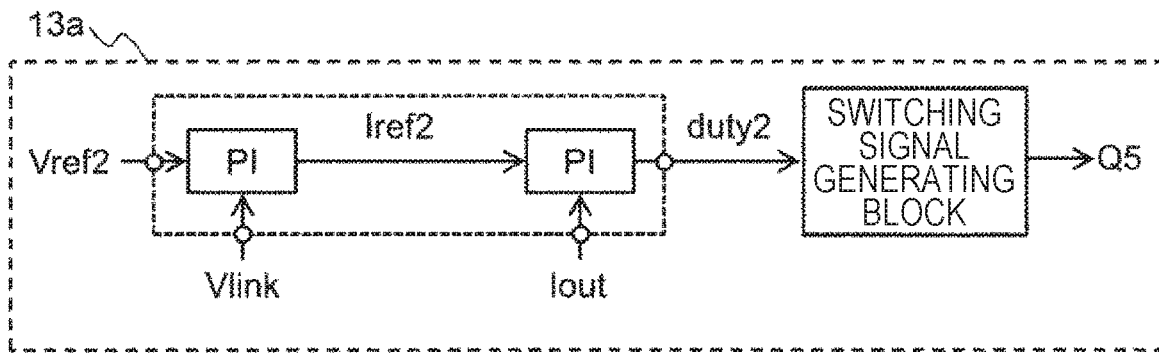

FIG. 3 (a) is a diagram illustrating basic control blocks for the control unit 11 to control the DC-DC circuit 9a. FIG. 3(b) is a diagram illustrating basic control blocks for controlling the DC-DC converter 3a.

A control block 12a of the DC-DC circuit 9a obtains a control current Iref1 by general proportional-integral (PI) feedback control based on the voltage Vout detected by the voltage sensor 24 with respect to a target output voltage Vref1. Iref1 is limited to a value not exceeding a current upper limit value Imax. Then, using a control signal duty1 obtained by the PI feedback control by a current Ilink detected by the current sensor 32 with respect to a target link current Iref1, a control pulse of each switching element is output in a switching signal generating block.

Similarly, a control block 13a of the DC-DC converter 3a obtains a control current Iref2 by the general PI feedback control based on the voltage Vlink detected by the voltage sensor 23 with respect to a target output voltage Vref2. Then, using a control signal duty2 obtained by the PI feedback control based on a current Iout detected by the current sensor 33 with respect to the control current Iref2, a control pulse of each switching element in the switching signal generating block is output.

Herein, Vref1 is set to the charge completion voltage of the battery. When Vref1 reaches the charge completion voltage of the battery, Iref1 decreases. Then, the DC-DC circuit 9a decreases the output power.

In addition, Vref2 is set to the first voltage. In a range where the battery voltage is lower than the first voltage (region A in FIG. 2), the DC-DC converter 3a maintains the link voltage at the first voltage. In a range where the battery voltage is higher than the first voltage (region B in FIG. 2), the DC-DC converter 3a shifts to the through operation since the on-time ratio of the switching element Q5 maintains the upper limit value.

Imax is given by a value obtained by dividing the voltage Vlink detected by the voltage sensor 23 from an output power command value Poutref of a charger, that is, Poutref/Vlink. In a case where constant power control is performed, a rated output power value is input for Poutref. In a case where constant current control is performed, Poutref is given by a product of a rated output current command value and the voltage Vout detected by the voltage sensor 24, that is, Ioutref×Vout.

By controlling as described above, when Vout is lower than the first voltage, the first voltage is input to the DC-DC converter 3a, and when Vout is between the first voltage and the charge completion voltage, a variable voltage that increases from the first voltage to the charge completion voltage in accordance with charging of the direct current battery is input to the DC-DC converter 3a.

Second Embodiment

Next, a second embodiment will be described. A basic configuration is the same as that of the first embodiment described in FIGS. 1 and 2. However, the present embodiment is different from the first embodiment in the control method of the DC-DC circuit 9a and the DC-DC converter 3a described in FIG. 3. In the present embodiment, control is switched according to Vout.

Figure 4A:
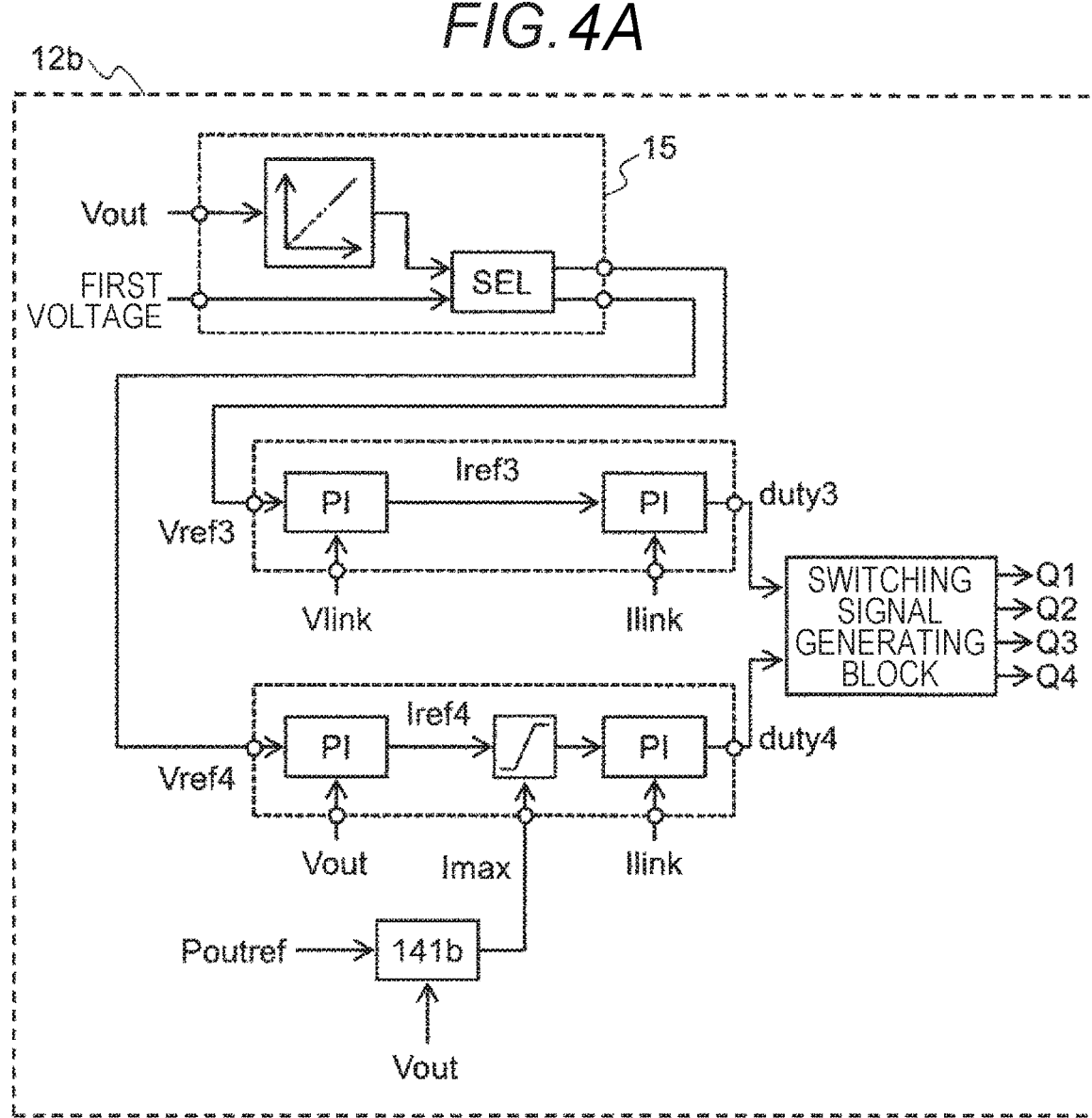
Figure 4B:
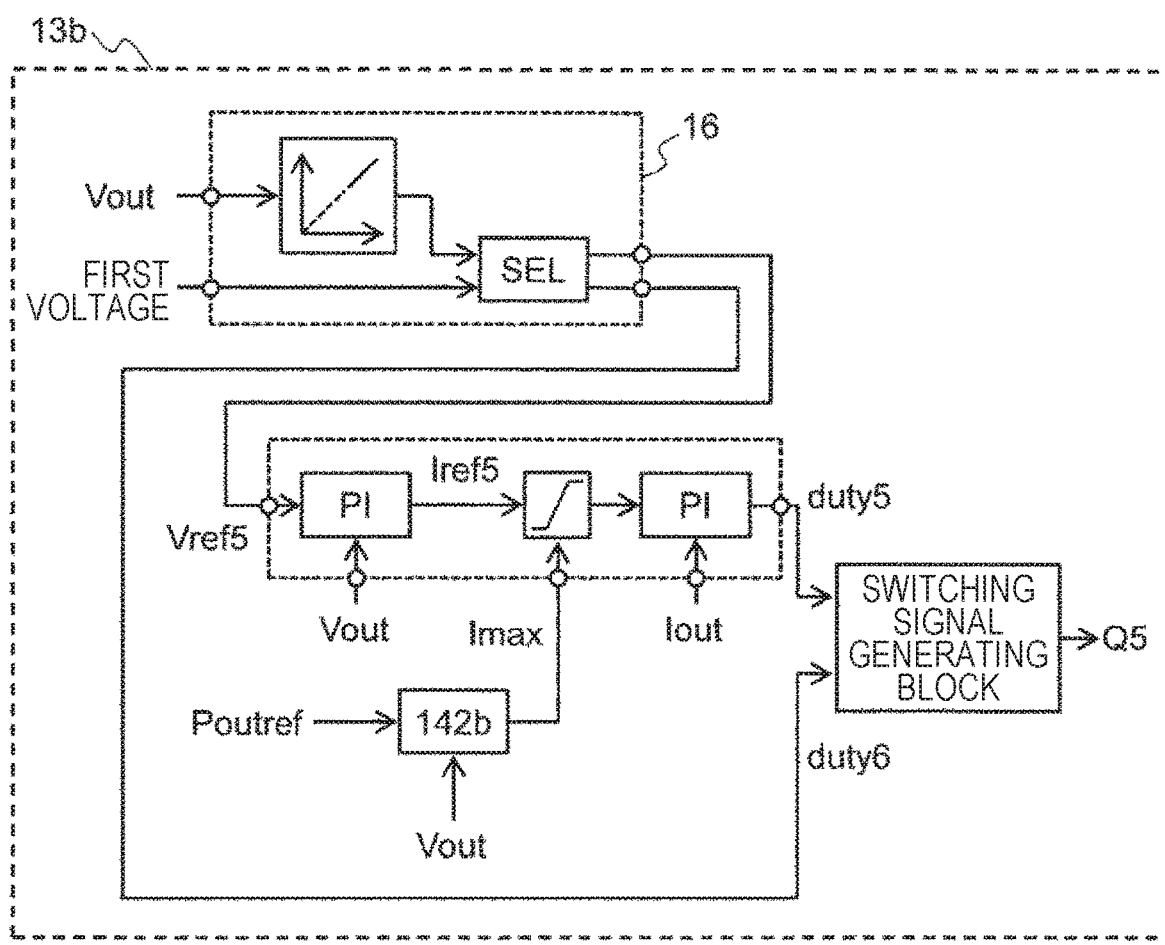

FIG. 4 (a) is a diagram illustrating basic control blocks for a control unit 11 to control a DC-DC circuit 9a. In the present embodiment, a control block 12b of the DC-DC circuit 9a includes a target voltage generating block 15. The control block 12b of the DC-DC circuit 9a first compares Vout and a first voltage in the target voltage generating block 15. In a case where Vout is lower than the first voltage, a voltage command value Vref3 is selected. In a case where Vout is higher than the first voltage, a voltage command value Vref4 is selected. Vref3 is set to the first voltage, and Vref4 is set to a charge completion voltage of a battery.

The operation of the control block 12b of the DC-DC circuit 9a in a range where Vout is lower than the first voltage will be described. This corresponds to the region A in FIG. 2. First, a control current Iref3 is obtained by the general PI feedback control based on a voltage Vlink detected by a voltage sensor 23 with respect to a target output voltage Vref3. A control value duty3 is obtained by the PI feedback control by a current Ilink detected by a current sensor 32 with respect to the obtained control current Iref3. Using the obtained control value duty3, a control pulse for each switching element is output in a switching signal generating block.

The operation of the control block 12b of the DC-DC circuit 9a in a range where Vout is higher than the first voltage will be described. This corresponds to the region B in FIG. 2. First, a control current Iref4 is obtained by the general PI feedback control based on the voltage Vlink detected by the voltage sensor 23 with respect to a target output voltage Vref4. The obtained control current Iref4 is limited to a value not exceeding a current upper limit value Imax given by a current upper limit value generating block 141b. Then, a control value duty4 is obtained by the PI feedback control by the current Ilink detected by the current sensor 32 with respect to the target output current Iref4. Using the obtained control value duty4, a control pulse of each switching element is output in the switching signal generating block.

FIG. 4 (b) is a diagram illustrating basic control blocks for controlling the DC-DC converter 3a. In the present embodiment, a control block 13b of the DC-DC converter 3a includes a target voltage generating block 16. The control block 13b of the DC-DC converter 3a compares Vout and the first voltage in the target voltage generating block 16.

In a range where Vout is lower than the first voltage, the control block 13b of the DC-DC converter 3a obtains a control current Iref5 by the general PI feedback control based on the voltage Vout detected by a voltage sensor 24 with respect to a target output voltage Vref5. Herein, Vref5 is set to the charge completion voltage of the battery. The obtained control current Iref5 is limited to a value not exceeding a current upper limit value Imax given by a current upper limit value generating block 142b. Then, a control value duty5 is obtained by PI feedback control based on the current Iout detected by a current sensor 33 with respect to the target output current Iref5. Using the obtained control value duty5, a control pulse of each switching element is output in the switching signal generating block.

In a range where Vout is higher than the first voltage, the control block 13b of the DC-DC converter 3a does not perform control and generates a duty6 so as to fix a switching element Q5 to an on state.

Imax is given by a value obtained by dividing the voltage Vout detected by the voltage sensor 24 from an output power command value Poutref of a charger, that is, Poutref/Vout. In a case where constant power control is performed, a rated output power value is input for Poutref. In a case where constant current control is performed, Poutref is given by a product of a rated output current command value and the voltage Vout detected by the voltage sensor 24, that is, Ioutref×Vout.

By controlling as described above, in a range where Vout is lower than the first voltage, the DC-DC circuit 9a controls the link voltage so as to be constant at the first voltage, and the DC-DC converter 3a controls output power. In a range where Vout is higher than the first voltage, the DC-DC circuit 9a controls the output power, and the DC-DC converter 3a stops the switching. By switching a target voltage value according to the voltage value of a direct current battery, a through operation of the DC-DC converter 3a can be achieved.

In the present embodiment, the control is switched according to a battery voltage, and in order to ensure a stable operation, the output power may be decreased at the time of the switching. As a concrete method, at the time of a control switching operation, the output power command value Poutref is set to a value smaller than a charger rated output power value, and after switching controllably, Poutref is set again to the charger rated output power value. These settings reduce the current flowing through the circuit at the time of the switching control. Therefore, this is effective in stabilizing the operation of the DC-DC converter 3a.

Third Embodiment

Next, a third embodiment will be described. A basic configuration is the same as that of the first embodiment described in FIGS. 1 and 2. However, the present embodiment is different from the first embodiment in the control method of the DC-DC circuit 9a and the DC-DC converter 3a described in FIG. 3. In the present embodiment, an output power command value is varied according to Vout.

Figure 5A:
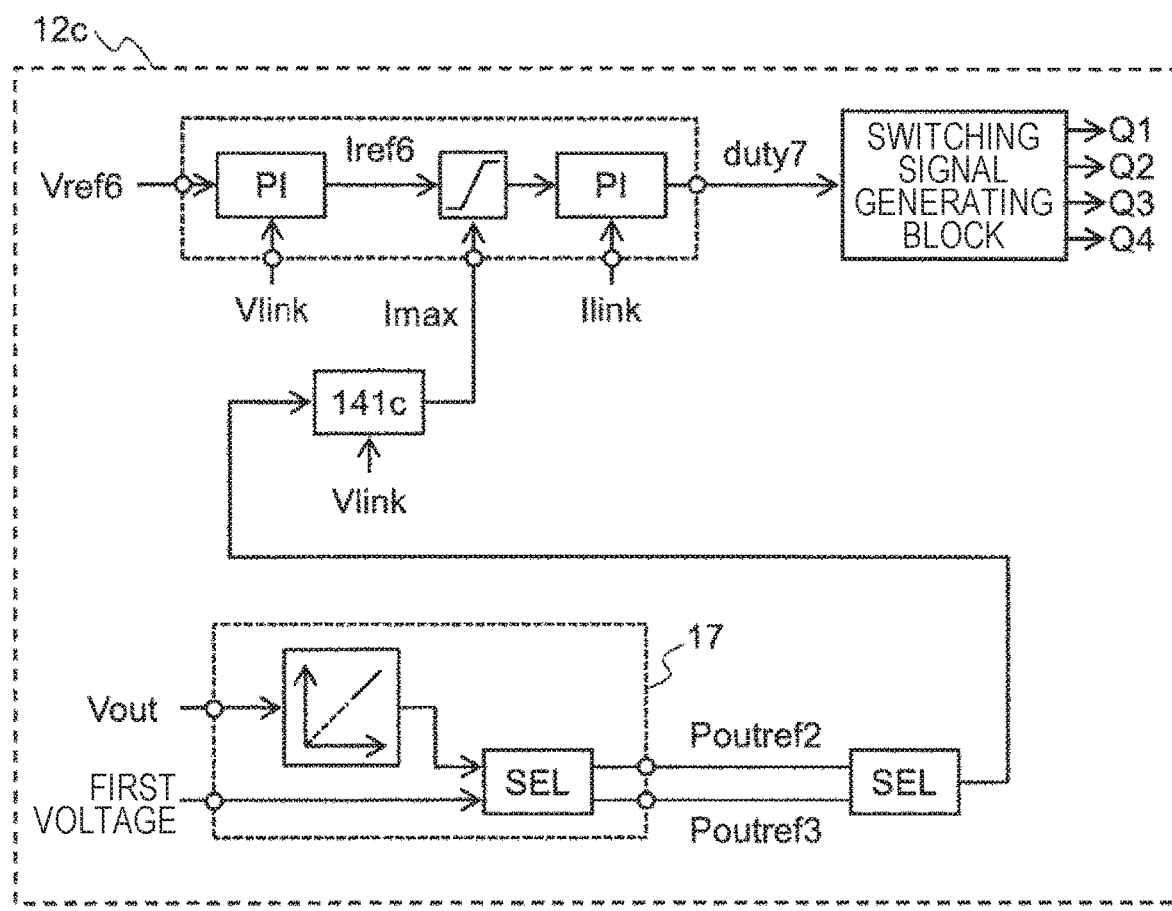

FIG. 5(a) is a diagram illustrating basic control blocks for a control unit 11 to control a DC-DC circuit 9a. In the present embodiment, a control block 12c of the DC-DC circuit 9a includes a target power generating block 17. The target power generating block 17 selects Poutref2 in a case Vout is lower than the first voltage, and selects Poutref3 when Vout is higher than the first voltage. Poutref2 is set to a value larger than the charger rated output power, and Poutref3 is set to the charger rated output power value.

The operation of the control block 12c of the DC-DC circuit 9a in a range where Vout is lower than the first voltage will be described. First, a control current Iref6 is obtained by general PI feedback control based on the voltage Vlink detected by a voltage sensor 23 with respect to a target output voltage Vref6. The obtained control current Iref6 is limited to a value not exceeding a current upper limit value Imax given by a current upper limit value generating block 141c. At this time, the current upper limit value Imax is obtained by Poutref2/Vlink. Then, a control value duty7 is obtained by PI feedback control based on a current Ilink detected by a current sensor 32 with respect to the target output current Iref6. Using the obtained control value duty7, a control pulse for each switching element is output in a switching signal generating block.

In a range where Vout is higher than the first voltage, the output of the target power generating block 17 is set to Poutref3. The current upper limit value Imax is given by Poutref3/Vlink. Others are the same as those in the control in the range where Vout is lower than the first voltage.

Figure 5B:
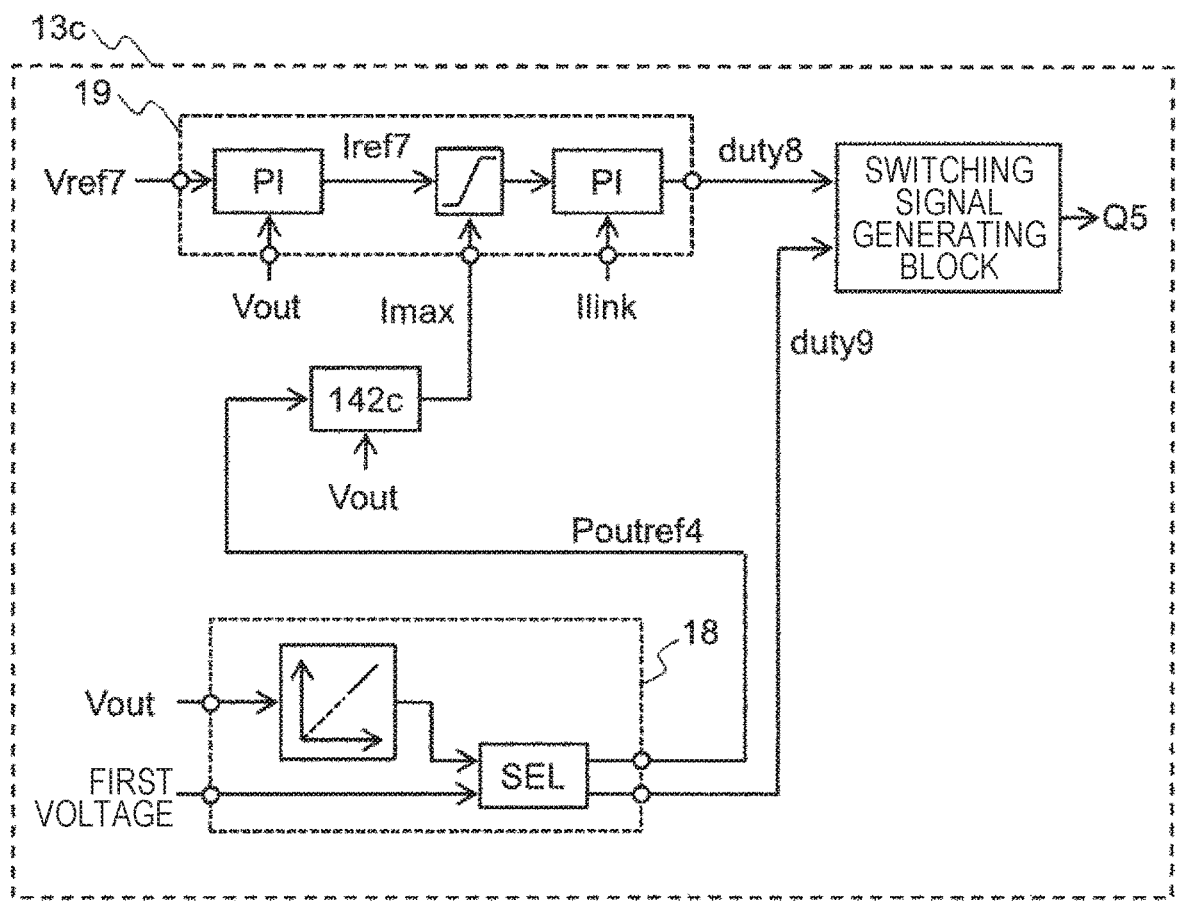

FIG. 5(b) is a diagram illustrating basic control blocks for controlling the DC-DC converter 3a. In the present embodiment, a control block 13c of the DC-DC converter 3a includes a target power generating block 18. The control block 13c of the DC-DC converter 3a compares Vout and the first voltage in the target power generating block 18.

The operation of the control block 13c of the DC-DC converter 3a in a range where Vout is lower than the first voltage will be described. First, a control current Iref7 is obtained by the general PI feedback control based on the voltage Vout detected by a voltage sensor 24 with respect to a target output voltage Vref7. The obtained control current Iref7 is limited to a value not exceeding a current upper limit value Imax given by a current upper limit value generating block 142c. At this time, Poutref4 is set to the charger rated output power. Imax is obtained by Poutref4/Vout. Then, a control value duty8 is obtained by PI feedback control based on a current Iout detected by a current sensor 33 with respect to a target output current Iref7. Using the obtained duty8, a control pulse of each switching element is output in the switching signal generating block.

In a range where Vout is higher than the first voltage, the control block 13c of the DC-DC converter 3a does not perform control and generates a duty9 so as to fix a switching element Q5 to an on state.

By controlling as described above, in a range where Vout is lower than the first voltage, the DC-DC circuit 9a controls the link voltage so as to be constant at the first voltage, and the DC-DC converter 3a controls output power. Although the output of the DC-DC circuit 9a is limited by Poutref2, the DC-DC circuit 9a does not operate because the output power limitation of the DC-DC converter 3a works. In a range where Vout is higher than the first voltage, the DC-DC circuit 9a controls the output power, and the DC-DC converter 3a stops the switching. By switching the target power value according to the voltage value of the direct current battery, the through operation of the DC-DC converter 3a can be achieved.

Note that also in the present embodiment, in a manner similar that in the second embodiment, the control is switched according to the battery voltage, and the output power may be decreased at the time of the switching in order to ensure a stable operation. As a concrete method, at the time of a control switching operation, the output power command value Poutref is set to a value smaller than a charger rated output power value, and after switching controllably, Poutref is set again to the charger rated output power value. These settings reduce the current flowing through the circuit at the time of the switching control. Therefore, this is effective in stabilizing the operation of the DC-DC converter 3a.

Fourth Embodiment

Figure 6:
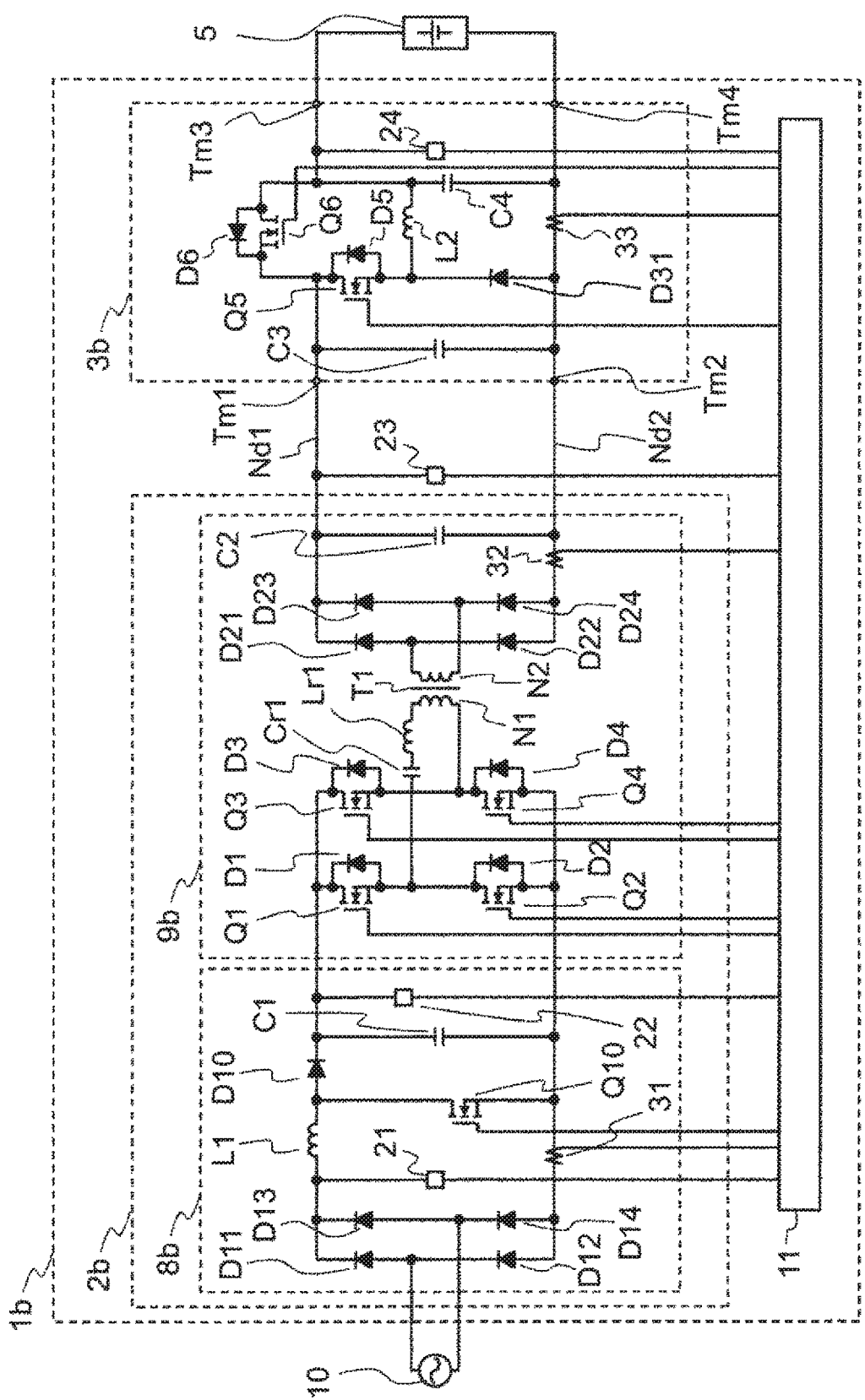
FIG. 6 is a circuit configuration diagram of a charging apparatus 1a according to a fourth embodiment.

FIG. 6 is a circuit configuration diagram of a charging apparatus 1b according to a fourth embodiment. The charging apparatus 1b differs from the charging apparatus 1a according to the first embodiment illustrated in FIG. 1 in that in a DC-DC converter 3a unit, a switching element Q6 is connected so as to bypass between Tm1-Tm3.

In a case where Vout is lower than a first voltage, a switching element Q5 in a DC-DC converter 3b performs switching on the basis of any control illustrated in FIGS. 3 to 5, and the switching element Q6 is in an off state. In a case where Vout is higher than the first voltage, the switching element Q5 is fixed to the on state in the above embodiment. However, in the present embodiment, the switching element Q5 is fixed to the off state and the switching element Q6 is set to the on state.

In the present embodiment, by providing the switching element Q6 and turning on the switching element Q6 at the time of a through operation, a winding loss of a smoothing inductor L2 at the time of a through operation can be reduced. Therefore, as compared with the configuration in FIG. 1, there is an advantage that efficiency is high.

Fifth Embodiment

Figure 7:
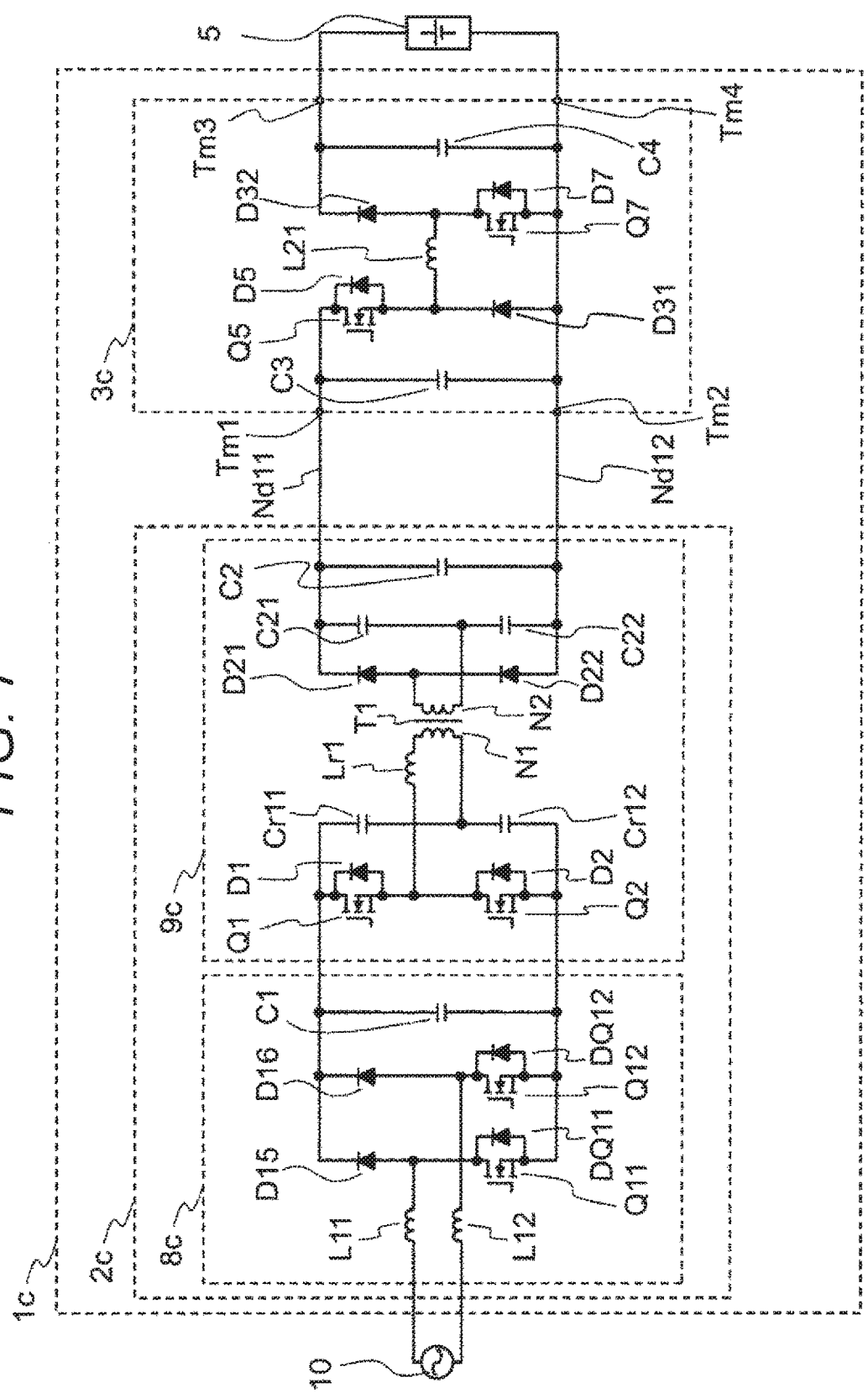
FIG. 7 is a circuit configuration diagram of a charging apparatus 1a according to a fifth embodiment.

FIG. 7 is a circuit configuration diagram of a charging apparatus 1c according to a fifth embodiment. The charging apparatus 1c according to the present embodiment includes an insulated AC-DC converter 2c and a DC-DC converter 3c. The insulated AC-DC converter 2c and the DC-DC converter 3c are connected via nodes Nd11-Nd12. Note that a control unit 11 and various sensors and signal lines connected to the control unit 11 are omitted from the figure.

The insulated AC-DC converter 2c includes an AC-DC circuit 8c and a DC-DC circuit 9c.

The AC-DC circuit 8c according to the present embodiment includes a diode D15 and a switching element Q11 connected in series, and a diode D16 and a switching element Q12 connected in series. These series-connected diodes and switching elements are connected in parallel across a smoothing capacitor C1. One end of a smoothing inductor L11 is connected to a connection point between the diode 15 and the switching element Q11. One end of a smoothing inductor L12 is connected to a connection point between the diode 16 and the switching element Q12. An alternating current power supply 10 is connected between the other end of the smoothing inductor L11 and the other end of the smoothing inductor L12. Diodes DQ11 and DQ12 are connected in anti-parallel to the switching elements Q11 and Q12, respectively.

In this way, the AC-DC circuit 8c is a bridge-less circuit that inputs a power supply from the alternating current power supply 10 and outputs a direct current voltage across the smoothing capacitor C1. The AC-DC circuit 8c that is a bridge-less circuit has an advantage of having higher efficiency than the AC-DC circuit 8a in FIG. 1.

In the DC-DC circuit 9c according to the present embodiment, configurations of a switching circuit connected to aside of a winding wire N1 of a transformer T1 and a rectifying circuit connected to a side of a winding wire N2 of the transformer T1 are different from those in FIG. 1.

The switching circuit connected to the side of the winding wire N1 of the transformer T1 includes a half bridge circuit in which switching elements Q1 and Q2 are connected in series. A connection point between the switching elements Q1 and Q2 is connected to one end of a winding wire N1 by disconnecting a resonance inductor Lr1. In addition, the DC-DC circuit 9c includes series-connected resonance capacitors Cr11 and Cr12 in parallel across the smoothing capacitor C1. A connection point between the resonance capacitors Cr11 and Cr12 is connected to the other end of the winding wire N1. The rectifier circuit connected to the side of the winding wire N2 of the transformer T1, diodes D23 and D24 in FIG. 1 are replaced with smoothing capacitors C21 and C22, respectively.

The DC-DC circuit 9c outputs a link voltage Vlink between the nodes Nd11-Nd12. This DC-DC circuit 9c is easier to simplify the circuit than the DC-DC circuit 9a employing the full bridge circuit in FIG. 1.

In the DC-DC converter 3c, the link voltage Vlink is input between terminals Tm1-Tm2, and a direct current voltage is output from between terminals Tm3-Tm4. The DC-DC converter 3c includes a smoothing capacitor C3, switching elements Q5 and Q7, diodes D31 and D32, a smoothing inductor L21, and a smoothing capacitor C4. The smoothing capacitor C3 is connected between the terminals Tm1-Tm2. The switching element Q5 and the diode D31 are connected in series, and the series connection body is connected between the terminals Tm1-Tm2. The smoothing inductor L21 and the switching element Q7 connected in series are connected in parallel across the diode D31. The diode D32 and the smoothing capacitor C4 connected in series are connected in parallel across the switching element Q7. A voltage across the smoothing capacitor C4 is output from between the terminals Tm3-Tm4. Then, a direct current battery 5 is connected between the terminals Tm3-Tm4.

Diodes D1, D2, D5, and D7 are connected in anti-parallel to switching elements Q1, Q2, Q5, and Q7, respectively.

Figure 8:
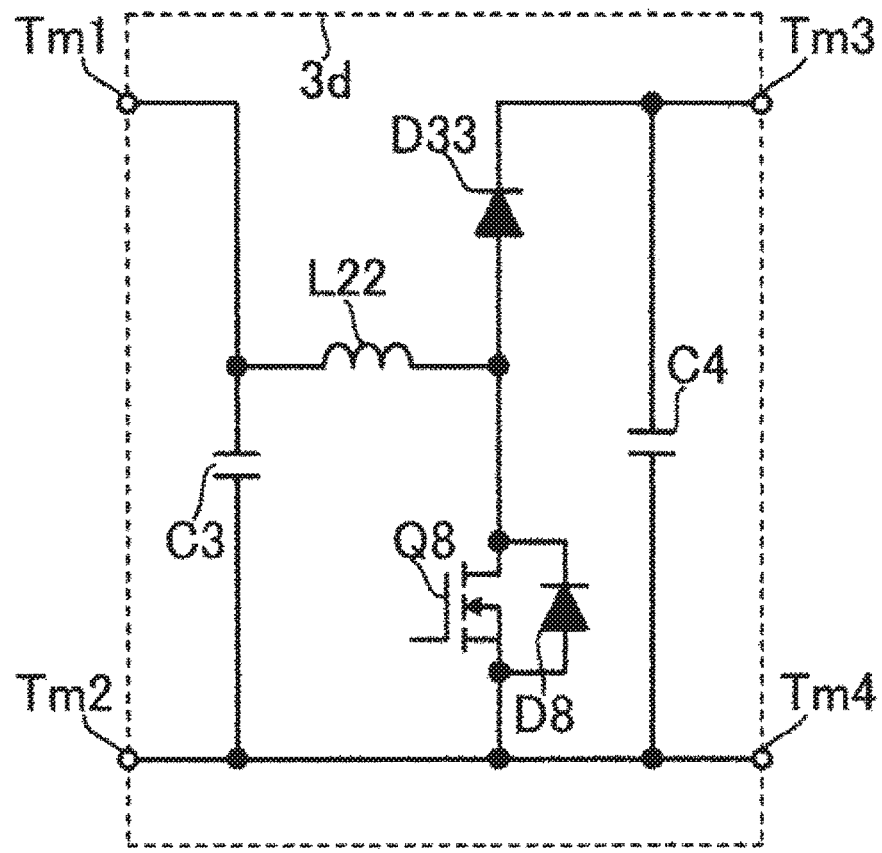

Note that in a case where a voltage of the direct current battery 5 is typically higher than the link voltage Vlink, the DC-DC converter 3c can be replaced with a DC-DC converter 3d illustrated in FIG. 8. The DC-DC converter 3d includes the smoothing capacitor C3 connected between the terminals Tm1-Tm2. A smoothing inductor L22 and a switching element Q8 connected in series are connected in parallel across the smoothing capacitor C3. A diode D33 and the smoothing capacitor C4 connected in series are connected in parallel across the switching element Q8. A voltage across the smoothing capacitor C4 is output from between the terminals Tm3-Tm4.

The DC-DC converter 3d can correspond to a voltage of the high direct current battery 5 while being simplified as compared with the DC-DC converter 3c. Of course, if the switching element Q8 is fixed to an off state, a through operation can be performed.

The charging apparatus according to the above-described embodiment includes the DC-DC converter between a direct current link voltage controlled according to an output voltage and the direct current battery, generates a link voltage having a narrower voltage range than that of the direct current battery, and supplies power to the direct current battery.

Sixth Embodiment

Figure 9:
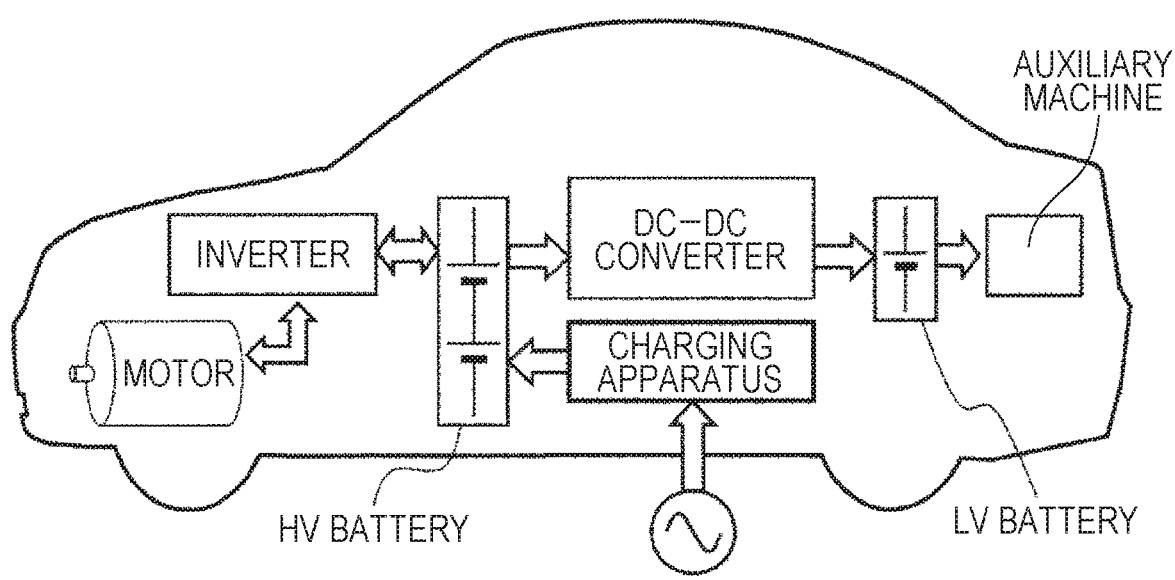
FIG. 9 is an example of a system in which a charging apparatus according to the present invention is applied to a vehicle.

FIG. 9 illustrates an example in which a charging apparatus 1 is applied to an electric vehicle (EV) as an example of a system including the charging apparatus according to the above-described embodiment.

A motor installed in a vehicle is driven by alternating current power converted by an inverter from direct current power stored in a high voltage (HV) battery. Conversely, regenerative electric power generated by the motor is stored in the HV battery via the inverter. The electric power stored in the HV battery (for example, at 170 to 450 V) is stepped down (for example, 12 V to 14 V) by a DC-DC converter, output to a low voltage (LV) battery, and used as driving power of an auxiliary machine.

The charging apparatus in the present embodiment is connected to an external alternating current power supply. Then, by the control as described in the first to fifth embodiments, the HV battery is charged.

REFERENCE SIGNS LIST 1a, 1b, 1c charging apparatus
2a, 2b, 2c insulated AC-DC converter
3a, 3b, 3c, 3d DC-DC converter
8a, 8b, 8c AC-DC circuit
9a, 9b, 9c DC-DC circuit
5 direct current battery
10 alternating current power supply
11 control unit
12a, 12b, 12c DC-DC circuit control block
13a, 13b, 13c DC-DC converter control block
14a, 141b, 142b, 141c, 142c current upper limit generating block
15, 16 target voltage generating block
17, 18 target power generating block
21, 22, 23, 24 voltage sensor
31, 32, 33 current sensor Vlink link voltage
Vout battery voltage
Q1 to Q8, Q10 to Q12 switching element
D1 to D8, D10 to D16, D21 to D24, DQ11, DQ12 diode
C1 to C4, C21, C22 smoothing capacitor
L1, L2, L11, L12, L21, L22 smoothing inductor
Cr1, Cr11, Cr12 resonance capacitor
Lr1 resonance inductor
T1 transformer
N1, N2 winding wire
Tm1 to Tm4 terminal
Nd1, Nd2, Nd11, Nd12 node

The invention claimed is:

1. A charging apparatus that charges a direct current battery, comprising:
a step-down converter unit that is configured to convert a direct current voltage input from a power supply to which a direct current voltage from a power supply is input and that converts the direct current voltage, wherein when a voltage of the direct current battery is between a predetermined first voltage lower than a charge completion voltage of the direct current battery and the charge completion voltage, and an input voltage to the step-down converter unit is controlled so as to increase from the first voltage to the charge completion voltage as the direct current battery charges; and
a step-up converter unit to which a direct current voltage from a power supply is input and that converts the direct current voltage, wherein
the direct current voltage converted by the step-up converter unit is input in the step-down converter unit, and the first voltage is input in the step-up converter unit,
when the voltage of the direct current battery is lower than the first voltage, the step-down converter unit is subjected to voltage control such that an input voltage to the step-down converter unit is the first voltage, and
the step-up converter unit is controlled such that power supplied to the direct current battery is constant power.

2. The charging apparatus according to claim 1, wherein when the voltage of the direct current battery is lower than the first voltage, the first voltage is input to the step-down converter unit.

3. The charging apparatus according to claim 1, wherein when the voltage of the direct current battery is lower than the first voltage, the step-up converter unit is subjected to the voltage control such that the input voltage to the step-down converter unit is the first voltage.

4. The charging apparatus according to claim 3, wherein when the voltage of the direct current battery is lower than the first voltage, the step-down converter unit is subjected to constant power control such that power supplied to the direct current battery is constant.

5. The charging apparatus according to claim 3, wherein when the voltage of the direct current battery is between the first voltage and the charge completion voltage, the step-up converter unit is subjected to the constant power control such that the power supplied to the direct current battery is constant.

6. The charging apparatus according to claim 1, wherein when the voltage of the direct current battery is the charge completion voltage or higher, the step-up converter unit is subjected to constant voltage control such that a voltage supplied to the direct current battery is constant.

7. The charging apparatus according to claim 1, further comprising
an AC-DC converter unit that converts an alternating current voltage into a direct current voltage,
wherein the direct current voltage converted by the AC-DC converter unit is input in the step-up converter unit.

8. The charging apparatus according to claim 1,
wherein the step-down converter unit includes an operation mode in which an input side and an output side of the step-down converter unit is short-circuited in a direct current manner.

9. A charging system comprising:
a direct current battery; and
the charging apparatus that charges the direct current battery according to claim 1.

10. A charging apparatus that charges a direct current battery, comprising:
a step-down converter unit that is configured to convert a direct current voltage input from a power supply, to which a direct current voltage from a power supply is input and that converts the direct current voltage, wherein when a voltage of the direct current battery is between a predetermined first voltage lower than a charge completion voltage of the direct current battery and the charge completion voltage, a variable voltage that increases from the first voltage to the charge completion voltage in accordance with charging of the direct current battery is input to the step-down converter unit;
a step-up converter unit to which a direct current voltage from a power supply is input and that converts the direct current voltage, wherein
the direct current voltage converted by the step-up converter unit is input in the step-down converter unit,
the first voltage is input in the step-up converter unit,
when the voltage of the direct current battery is lower than the first voltage, the step-down converter unit is subjected to voltage control such that an input voltage to the step-down converter unit is the first voltage, and
when the voltage of the direct current battery is between the first voltage and the charge completion voltage, the step-down converter unit is subjected to the voltage control such that the input voltage to the step-down converter unit is the voltage of the direct current battery.

11. The charging apparatus according to claim 10,
wherein when the voltage of the direct current battery is lower than the first voltage, the first voltage is input to the step-down converter unit.

12. The charging apparatus according to claim 10,
wherein the step-up converter unit is controlled such that power supplied to the direct current battery is constant power.

13. The charging apparatus according to claim 10,
wherein when the voltage of the direct current battery is lower than the first voltage, the step-up converter unit is subjected to the voltage control such that the input voltage to the step-down converter unit is the first voltage.

14. The charging apparatus according to claim 13,
wherein when the voltage of the direct current battery is lower than the first voltage, the step-down converter unit is subjected to constant power control such that power supplied to the direct current battery is constant.

15. The charging apparatus according to claim 13,
wherein when the voltage of the direct current battery is between the first voltage and the charge completion voltage, the step-up converter unit is subjected to the constant power control such that the power supplied to the direct current battery is constant.

16. The charging apparatus according to claim 10,
wherein when the voltage of the direct current battery is the charge completion voltage or higher, the step-up converter unit is subjected to constant voltage control such that a voltage supplied to the direct current battery is constant.

* * * * *